(12) United States Patent
Day et al.

(10) Patent No.: US 7,774,320 B1
(45) Date of Patent: Aug. 10, 2010

(54) VERIFYING INTEGRITY OF FILE SYSTEM DATA STRUCTURES

(75) Inventors: Mark Steven Day, Saratoga, CA (US);
Wenguang Wang, Cupertino, CA (US);
Puja Dilip Gupta, Sunnyvale, CA (US);
Christopher Yoshito Emura, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1306 days.

(21) Appl. No.: 11/097,776

(22) Filed: Apr. 1, 2005

(51) Int. Cl.
*G06F 7/00* (2006.01)
*G06F 17/00* (2006.01)

(52) U.S. Cl. .................................. 707/690

(58) Field of Classification Search ........... None
See application file for complete search history.

(56) References Cited

U.S. PATENT DOCUMENTS 6,101,507 A * 8/2000 Cane et al. ............. 707/204

2004/0210591 A1* 10/2004 Hirschfeld et al. ......... 707/100
2004/0260927 A1* 12/2004 Grobman ................. 713/172

OTHER PUBLICATIONS

Karp et al., "Efficient Randomized Pattern-Matching Algorithms", IBM J. Res. Develop, vol. 31, No. 2, pp. 249-260, Mar. 1987.*
Kim et al., "The Design and Implementation of Tripwire: A File System Integrity Checker", CCS '94, pp. 18-29, 1994, ACM.*

* cited by examiner

*Primary Examiner*—Neveen Abel Jalil
*Assistant Examiner*—Michael J Hicks
(74) *Attorney, Agent, or Firm*—Fish & Richardson P.C.

(57) ABSTRACT

Systems, methods, computer program products, and means are provided for verifying the integrity of data structures. A system includes a first data structure, a second data structure, and a fingerprint block. The first data structure has a first set of unique identifiers. The second data structure has a second set of unique identifiers. The fingerprint block verifies correspondence between the first and second data structures by performing a mathematical function on the first and second sets of unique identifiers to produce a result indicative of correspondence.

30 Claims, 7 Drawing Sheets

VERIFYING INTEGRITY OF FILE SYSTEM DATA STRUCTURES

BACKGROUND

The following disclosure generally relates to file systems and methods for verifying the integrity of data structures.

Conventional file systems can store metadata associated with a file in several related data structures. The data structures, although organized in different ways, can have some data correspondence since they are sourced from the same metadata. However, data transfers into and out of the data structures can introduce correspondence errors and thereby corrupt the data structures.

Conventional file systems can periodically verify correspondence between data structures to identify correspondence errors. One conventional verification process is to count the number of files represented in each of the data structures, and compare the final count. If the counts match, a file system can assume correspondence. One problem with conventional verifications is a high collision rate. A collision occurs when the counts for two data structures are the same, despite the existence of correspondence errors. For example, both data structures can be missing a different file, but have the same count.

Another conventional verification process is to generate a list of files having a certain attribute for each data structure and compare lists. For large and unordered data structures, a large amount of memory is required to store lists of file names associated with an attribute as there can be millions or billions of file names in a data structure. Furthermore, an unordered data structure typically requires significant processing resources to cross-check lists.

SUMMARY

This disclosure generally describes systems, methods, computer program products, and means for verifying the integrity of data structures. In one implementation, the data structures can included a large number of unique identifiers that form an unordered data set. The unique identifiers can be associated with metadata. Correspondence between unique identifiers can be verified by performing a mathematical function on the data structures. In one example, the data structures are file structures having unique file names that are associated with extended attributes. In this example, correspondence between the unique file names can be verified by performing a modulo function against unique integers representing the unique file names to produce fingerprints (or hashes) for comparison.

In general, in one aspect, a method is provided. The method includes receiving a first data structure having a first set of unique identifiers; receiving a second data structure having a second set of unique identifiers; and verifying correspondence between the first and second data structures, including performing a mathematical function on the first and second sets of unique identifiers to produce a result indicative of correspondence.

In general, in another aspect, a method is provided. The method includes receiving a first data structure having first metadata; receiving a second data structure having second metadata; and verifying correspondence between the first and second data structures including, determining one or more result arrays representative of a correspondence between the first and second file data structures.

Particular implementations can include one or more of the following features. Verifying can include determining a result array with a modulo value. Verifying can include determining a result array with a modulo array. The first and second metadata can include integers to uniquely identify portions of the first and second data structures. The modulo array can include a set of integers, each integer being a relative prime to the set of integers. A least common multiple of the modulo array can be substantially larger than a total number of unique identifiers associated with the first and second metadata. Verifying can include filtering unique identifiers based on a query request; adjusting a value in a first result array for each file attribute of the first data structure that satisfies conditions of the query request; complementary adjusting a value in a second result array for each file attribute of the second data structure that satisfies conditions of the query request, and comparing of the first and second arrays to determine correspondence. Verifying can include filtering unique identifiers based on a query request; adjusting a value in a result array for each file attribute of the first data structure that satisfies conditions of the query request; complementary adjusting a value in the result array for each file attribute of the second data structure that satisfies the conditions of the query request; and determining that correspondence exists between the first and second data structures if the array includes zero values after complementary adjusting is complete.

The method can further include initializing verification responsive to one or more of a hardware power interruption, a software crash, a software exception, a time out, or a user selection from a user interface. The method can further include outputting results of verifying including a correspondence error flag. The method can further include performing a data repair responsive to a correspondence error between the first and second data structures. The first and second data structures can be associated with a file structure selected from the group containing a HFS (Hierarchical File System), UFS (Unix File System), NTFS (New Technology File System), and FAT (File Allocation Table). The first and second metadata can include file names and attributes associated with files.

In general, in another aspect, a method is provided. The method includes receiving a first data structure having unique integers associated with one or more file names; receiving a second data structure having the unique integers associated with the one or more file names, the second data structure organized differently from the first data structure; and verifying correspondence between the first and second data structures including, determining one or more arrays with a modulo array, each modulo value in the modulo array being a relative prime to the set of integers and the modulo array having a least common multiple that is greater than or equal to a total number of the unique integers, the one or more arrays representative of a correspondence between the first and second data structures.

In general, in another aspect, a method is provided. The method includes receiving a first data structure having first metadata associated with one or more files; receiving a second data structure having second metadata associated with the one or more files; initializing verification responsive to one or more of a power interruption, a software crash, a software exception, a time out or a user selection from a user interface; verifying correspondence between the first and second data structures including, determining one or more result arrays representative of a correspondence between the first and second data structures; outputting results of the verification including a correspondence error flag; and performing a data repair responsive to a correspondence error between the first and second data structures.

In general, in another aspect, a system is provided. The system includes a first data structure having first metadata associated with one or more files; a second data structure having second metadata associated with the one or more files; and a fingerprint block, in communication with the first and second data structures, to verify correspondence between the first and second data structures, the fingerprint block determining one or more result arrays representative of a correspondence between the first and second data structures.

Particular implementations can include one or more of the following features. The fingerprint block can include a modulo block to determine a result array with a modulo value. The fingerprint block can include a modulo block to determine a result array with a modulo array. The first and second metadata can include integers to uniquely identify portions of the first and second data structures. The modulo array can include a set of integers, each integer being a relative prime to the set of integers. A least common multiple of the modulo array can be substantially larger than a total number of unique identifiers associated with the first and second metadata. The fingerprint block can include a query block to filter unique identifiers based on a query request; a modulo block to adjust a value in a first result array for each file attribute of the first data structure that satisfies conditions of the query request and complementary adjust a value in a second result array for each file attribute of the second data structure that satisfies conditions of the query request; and a comparison block to compare the first and second result arrays to determine correspondence. The fingerprint block can include a query block to filter unique identifiers based on a query request; a modulo block to adjust a value in an array for each file attribute of the first data structure that satisfies conditions of the query request, and complementary adjust a value in the array for each file attribute of the second data structure that satisfies the conditions of the query request; and a comparison block to determine that correspondence exists between the first and second data structures if the array includes zero values after complementary adjusting is complete.

The system can further include an event monitor, in communication with the fingerprint block, to initialize verification in the fingerprint block responsive to one or more of a hardware power interruption, a software crash, a software exception, a time out, or a user selection from a user interface. The fingerprint block can output results of verifying including a correspondence error flag. The system can further include a data repair block, in communication with the fingerprint block, to perform a data repair responsive to a correspondence error between the first and second data structures. The first and second data structures can be associated with a file structure selected from the group containing a HFS (Hierarchical File System), UFS (Unix File System), NTFS (New Technology File System), and FAT (File Allocation Table). The first and second metadata can include file names and attributes associated with files.

In general, in another aspect, a system is provided. The system includes a means for receiving a first data structure having a first set of unique identifiers; means for receiving a second data structure having a second set of unique identifiers; and means for, in communication with the means for receiving the first data structure and the means for receiving the second data structure, verifying correspondence between the first and second data structures, including performing a mathematical function on the first and second sets of unique identifiers to produce a result indicative of correspondence.

In general, in another aspect, a computer program product is provided. The computer program product can be tangibly stored on a computer-readable medium, the product including instructions operable to cause a computer system to perform a method, including receiving a first data structure having a first set of unique identifiers; receiving a second data structure having a second set of unique identifiers; and verifying correspondence between the first and second data structures, including performing a mathematical function on the first and second sets of unique identifiers to produce a result indicative of correspondence.

Aspects of the invention may offer one or more of the following advantages. A proposed system checks data structure integrity with an efficient use of memory and processing resources. The proposed system can quickly process a large and unordered set of numbers.

DETAILED DESCRIPTION

Figure 1:
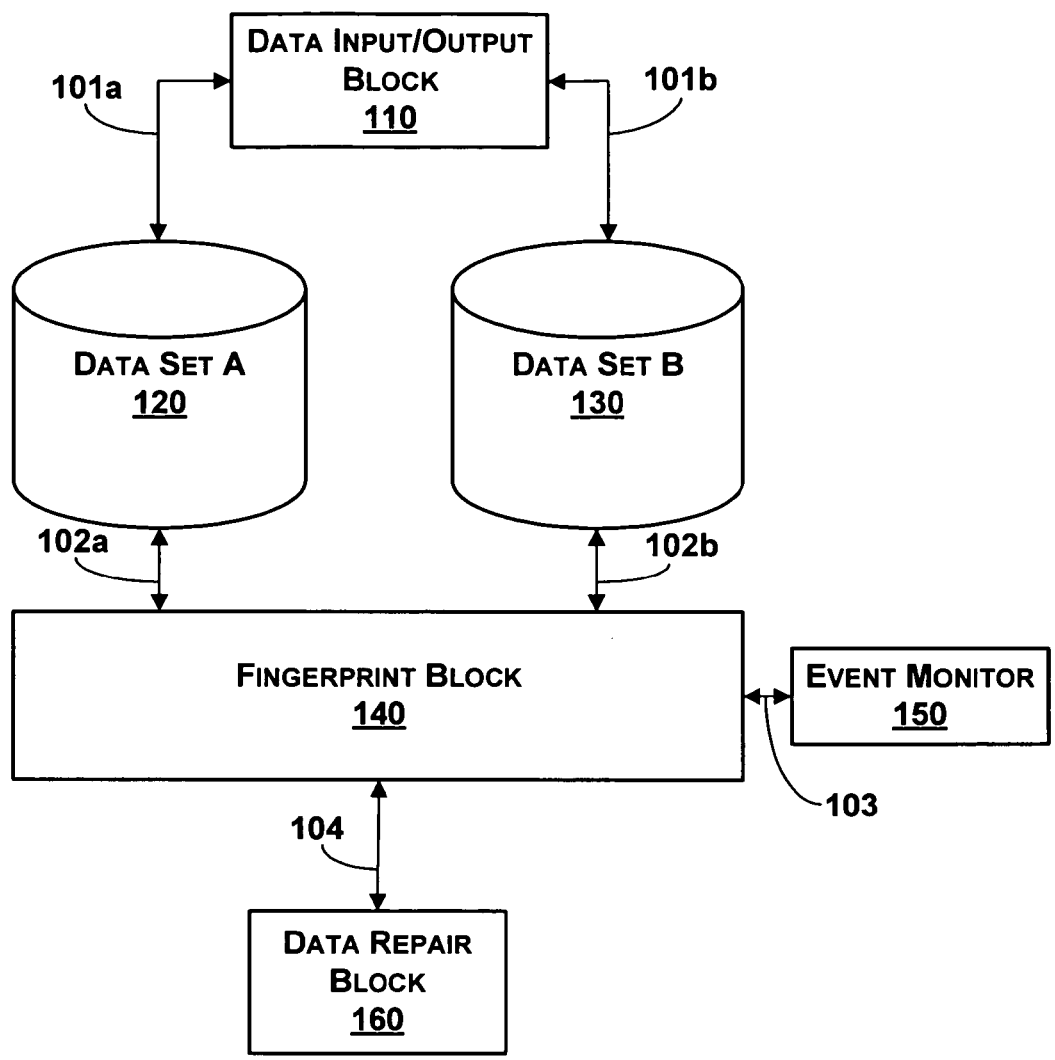
FIG. 1 is a block diagram illustrating a proposed system to verify the integrity of data structures.

FIG. 1 is a block diagram illustrating a system for maintaining data structure integrity. System 100 includes a data input/output block 110, a data set A 120, a data set B 130, a fingerprint block 140, an event monitor 150, and a data repair block 160.

Data input/output block 110 is coupled to lines 101*a,b* for data exchange with data set A 120 and data set B 130. Lines 101*a,b* can be a bus, dedicated line, software port, or other type of communication channel. Data input/output block 110 can be, for example, a file system module, an operating system module, part of a software application, and the like. In one implementation, data input/output block 110 reads and/or writes information, such as file data and metadata associated with a file, to data sets A and B 120,130. For example, an operating system using HFS (Hierarchical File System) can generate data structures and manage data correspondence between data sets A and B 120,130. Verification of data correspondence can be due to, for example, entry of data into two different types of data structures, data replication or back-up, data migration, and the like. Besides, HFS, data input/output block 110 can use other file systems such as UFS (Unix File System), NTFS (New Technology File System), FAT (File Allocation Table), and the like. In another implementation, data input/output block 110 can populate fields in a data structure from attributes or characteristics associated with a file. For example, data input/output block, 110 can send to data sets A and B 120,130 a file name and an extended attributed flag as discussed in greater detail below. Data input/output block 110 can store files data separately from data sets A and B 120,130. File data can be data files generated by a user, system file used by an operating system loaded from a CD, and the like.

Data set A 120 is coupled to line 101*a* for receiving, in one implementation, metadata associated with files. Data set A 120 is coupled to line 102*a* for receiving query requests from and sending query results to fingerprint block 140. Data set A 120 can be stored, for example, as a volume, a data repository, a data container, a database, and the like. Data set A 120 can be stored in hardware such as a hard disk or volatile memory. Generally, data set A 120 can be a large set of unordered data (e.g., millions or more entries). In one implementation, data set A 120 can be a data structure associated with stored files such as a file system. Data set A 120 can include metadata having, for example, a file name, file attributes, and the like. The files can be stored in a separate database. In one implementation, a file name is represented as an integer. The integer can be determined from the file name and its path in the file system to uniquely identify the file name (i.e., integer serves as a unique identifier). Data set A 120 can be searched or filtered to generate subsets satisfying certain conditions as described below in association with FIG. 2.

Data set B 130 is coupled to line 101b for receiving metadata associated with files. In one implementation data set B 130 can be a data structure sourced from the same files and metadata as data set A 130. Data set B 130 can be organized in an alternative format compared to data set A 120. For example, where metadata includes file names and attributes, data set A 120 can be a data structure organized mainly by file names and each file name having attributes, whereas data set B 130 can be a data structure organized mainly by the attributes and each attribute having an associated file name. Thus, there is correspondence between data sets A and B 120,130. Example data structures associated with data sets A and B 120,130 are discussed in more detail below in association with FIGS. 5 and 6.

Fingerprint block 140 is coupled to lines 102a,b for sending query requests and receiving query results in association with data sets A and B 120,130. Fingerprint block 140 is also coupled to line 103 for receiving initialization information from event monitor 150. Fingerprint block 140 is coupled to line 104 for sending integrity results to data repair block 160. In one implementation, fingerprint block 140 verifies correspondence or data structure integrity between data sets A and B 120,130 with a mathematical function (e.g., modulo operation). Fingerprint block 140 can initialize verification in response to event information received from event monitor 150. In response, fingerprint block 140 generates query requests based on how target data structures are organized. Fingerprint block 140 can analyze query results for correspondence and generate integrity results to, for example, initiate a data repair. Additional blocks associated with fingerprint block 140 and their operations are described in greater detail below.

Event monitor 150 is coupled to line 103 for sending the initialization information to fingerprint block 140. Event monitor 150 can be, for example, a daemon executing as a background process, or a user interface module. In one implementation, event monitor 150 tracks states of, for example, hardware or software associated with system 100 to determine when an integrity check is needed. For example, event monitor 150 can be responsive to hardware power interrupts, software crashes, exceptions, time outs, or other events that potentially introduce errors into data transfers. In another example, event monitor 150 can be responsive to manual triggers through a user interface as described below in association with FIG. 5. Event monitor 150 generates the initialization information to include, for example, a command to check data structure integrity, or merely event information used by fingerprint block 140 to assess whether to perform an integrity check.

Data repair block 160 receives the integrity information from fingerprint block 140. In one implementation, data repair block 160 reorganizes data structures of data sets A and/or B 120,130 to remove errors. In another implementation, data repair block 160 reports errors to, for example, an associated application program, and operating system, or a user.

System 100 can be implemented in hardware and/or software. For example, system 100 can be part of an operating system that supports a file system.

Figure 2:
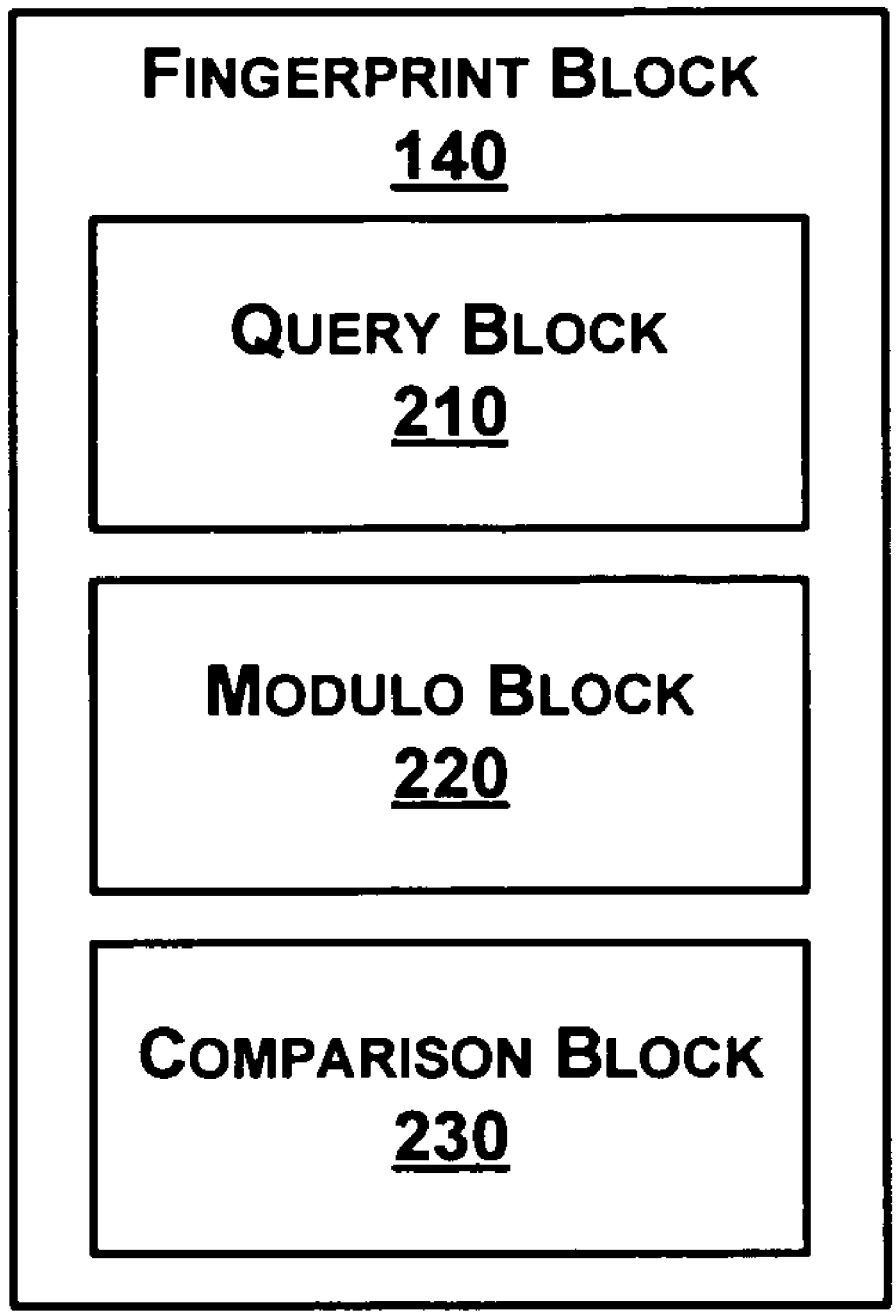
FIG. 2 is a block diagram illustrating a fingerprint block.

FIG. 2 is a block diagram illustrating fingerprint block 140. Fingerprint block 140 includes a query block 210, a modulo block 220, and a comparison block 230.

In one implementation, query block 210 generates search queries. In one implementation, query block 210 can parse an integrity check into several queries. For example, one data structure can have a unique identifier associated with multiple file attributes (e.g., unique identifier[A,B,C]). An additional data structure can have extended attributes with associated unique identifiers (e.g., A[unique identifiers], B[unique identifiers], C[unique identifiers]). In the example, query block 210 generates separate search queries related to each attribute and for each data structure. Query block 210 can use database search terms (e.g., SQL commands), filtering, sorting, and the like.

In one implementation, modulo block 220 analyzes the query results by generating fingerprints. A fingerprint can be an array or hash representing unique identifiers (e.g., integers) associated with a set of data. The search results can contain, for example, file names from the above described search queries. In one implementation, modulo block 220 can perform a serial analysis on the search results by incrementing values in a fingerprint associated with data set A 120 and decrementing values in the fingerprint associated with data set B 130. In another implementation, modulo block 220 can perform a parallel analysis on the search results by incrementing values in separate fingerprints for data sets A and B 120,130.

In one implementation, comparison block 230 checks the fingerprint, or fingerprints, to verify integrity, or lack thereof. For the serial example, comparison block 230 checks to see if the modulo array has all zeroes (i.e., a decrement to offset each increment). If there are all zeroes, there are no correspondence errors, outside of the possibility of a collision error described below. If there are not all zeroes, each of the increments was not offset by a decrement, indicative of a correspondence error. The comparison block 230 can generate integrity results which can include a correspondence error flag.

Figure 3:
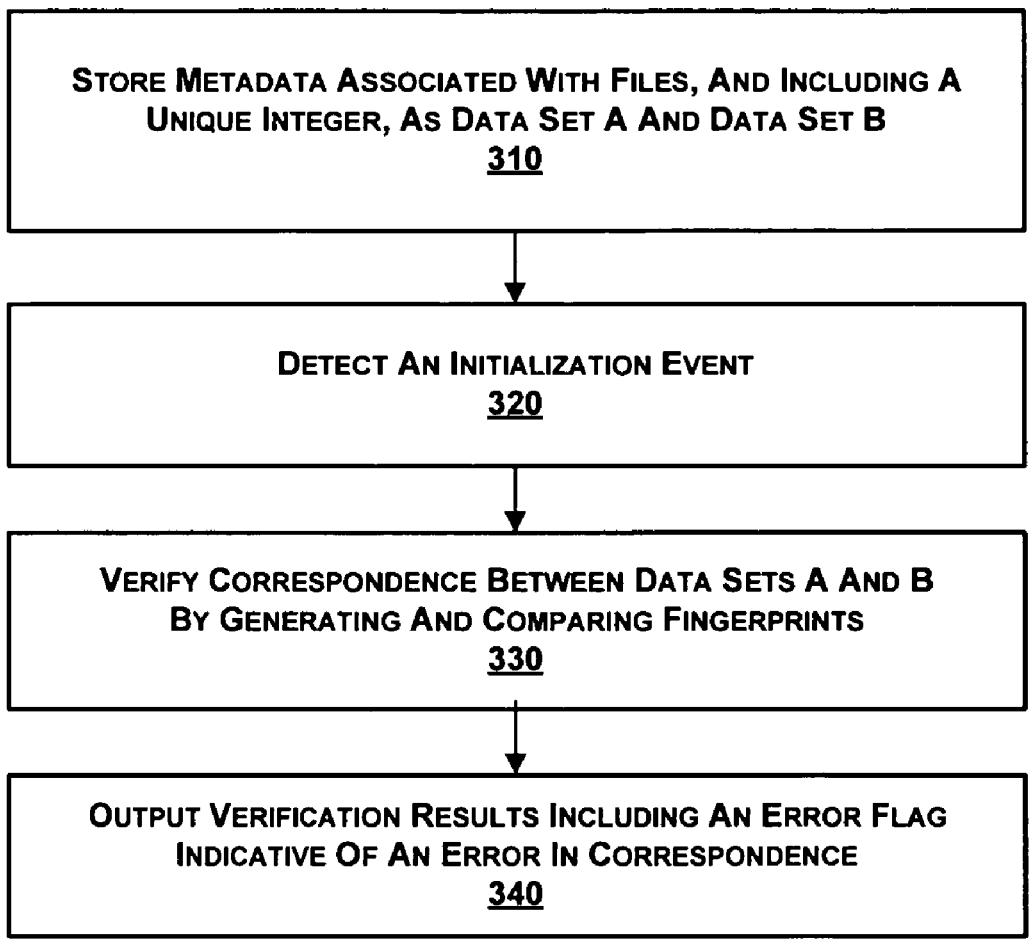
FIG. 3 is a flow diagram illustrating a method for verifying the integrity of data structures.

FIG. 3 is a flow diagram illustrating one implementation of a method 300 for checking data structure integrity. Metadata associated with files, and including a unique integer, are stored as data set A and data set B 310 (e.g., by input/output block 110 as data set A 120 and data set B 130). The files can be stored in data storage such as a hard disk. Metadata can be organized into a data structure specified by the type of file system in use (e.g., HFS, UFS, NTFS, or FAT). The file system can store metadata in alternative formats needed for different uses of metadata. For example, where metadata includes file names and attributes, data set A 120 can be a data structure from the perspective of file names and each file name having attributes, and data set B 130 can be a data structure from the perspective of the attributes and each attribute having an associated file name.

An initialization event is detected 320 (e.g., by event monitor 150). In one implementation, states of hardware and/or software are tracked to detect irregularities that can introduce errors in data structure integrity. For example, changes to a file structure stored in volatile memory that have yet to be backed up on nonvolatile memory can be lost in the event of a power interruption or software exception. In another example, a user or application can request an integrity check through a user interface. In one implementation, initialization events can be generated periodically in the absence of irregularities. In response to certain events, the verification process is initialized.

A correspondence between data sets A and B is verified by generating and comparing fingerprints 330 (e.g., by fingerprint block 140). In one implementation, a fingerprint is generated as a hash of the unique identifiers used to populate an array of remainders. The fingerprint provides a description of the data set which can be compared to a description of a different data set to determine correspondence, or lack thereof. The fingerprint is implemented with characteristics to achieve a predetermined level of reliability. In another implementation, the fingerprints can be compared during a boot-up process or the like where a relatively small amount of memory is available. Details associated with verification are described in more detail below in association with FIG. 7.

Verification results, which in one implementation include a correspondence error flag, are output 340 (e.g., to data repair block 160). The correspondence error flag can be set with a bit, for example, as an indication of an integrity failure, or can include a more detailed description of errors. In one implementation, repair processes are initialized in response to correspondence errors.

Figure 4:
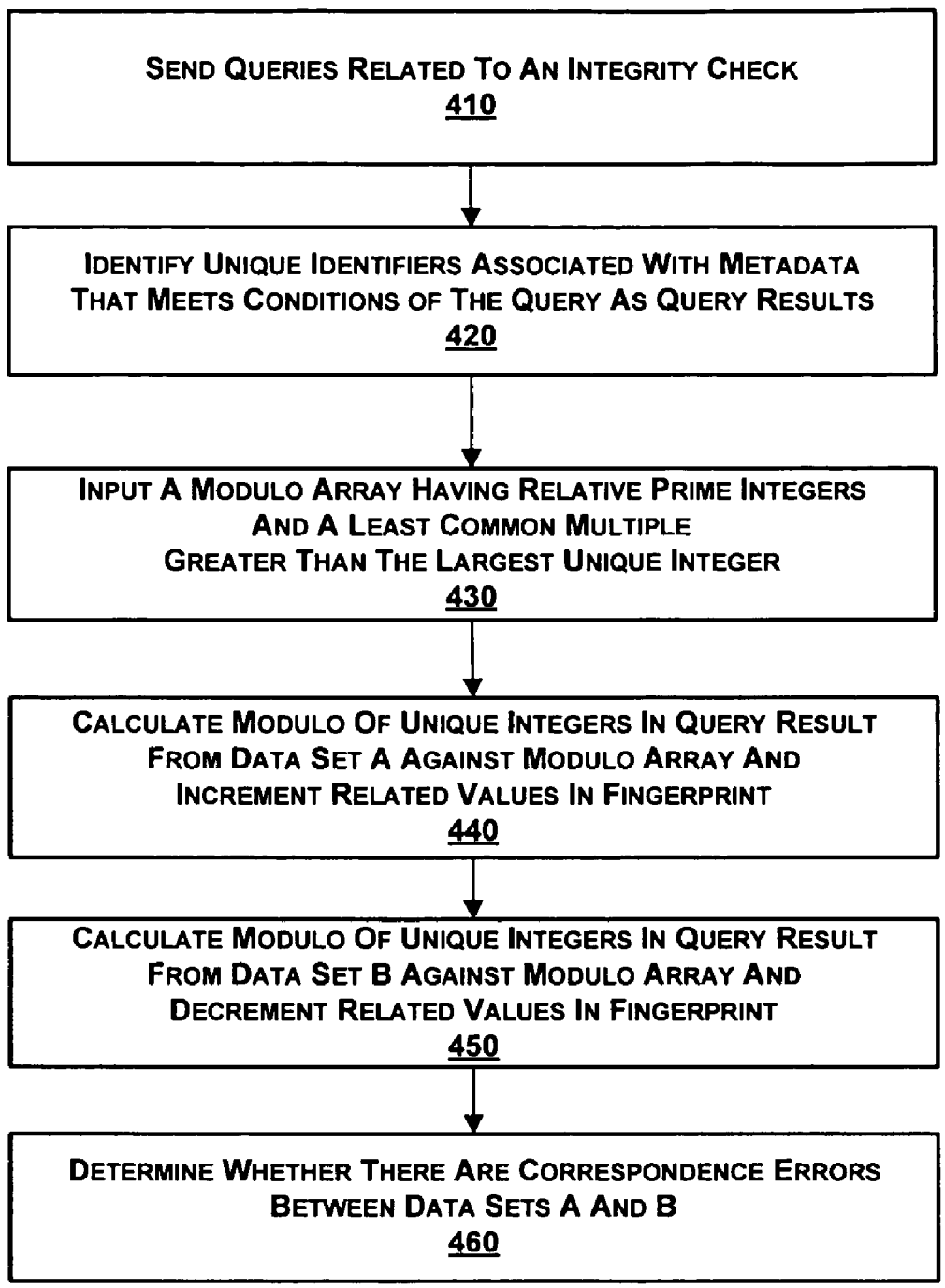
FIG. 4 is a flow diagram illustrating a method for comparing fingerprints in association with a data set A and a data set B.

FIG. 4 is a flow diagram illustrating a method 400 for generating a fingerprint in association with a data structure. Search queries related to an integrity check are sent 410 (e.g., from query block 200). In one example, for an integrity check related to attribute X, a query for identifiers having an associated attribute X is sent to a data set A (e.g., identifier[X] is sent to data set A 120). Also, a query for file names associated with the attribute X is sent to a data set B (e.g., X[identifiers] is sent to data set B 130).

Unique identifiers associated with metadata that meet conditions of the query are identified as query results 420. In one implementation, a data set is filtered to generate a subset of unique identifiers that meet the conditions. The subset can form an array of search results output (e.g., to modulo block 220).

A modulo array is input 430 (e.g., in modulo block 220). In one implementation, the modulo array is a group of moduli, e.g., m[1], m[2], . . . m[n]. The modulo array can have characteristics that increase the probability that a fingerprint is unique, which in turn, increases the reliability of integrity results. For example, the modulo array can be limited to integers for a memory-efficient implementation. The integers can have, in one implementation, a relative prime relationship. In contrast to a pure prime number that is only evenly divisible by itself and 1, a group of relative prime numbers have unique divisors with respect each other (e.g., 10 and 11 are relative prime even though 10 is divisible by 2; 10 and 12 are not relative prime since they are both divisible by 2). In another example, the modulo array can have a least common multiple that is greater than the total number of unique identifiers. Thus, a modulo array including [2,3] reliably supports up to six unique identifiers. Reliability increases with the least common multiple. As a result, a modulo array including [2,3,5] supporting six unique identifiers has a higher probability of producing a unique fingerprint without collision. A collision occurs when fingerprints associated with data sets having different data are identical, and thus, produce a false positive of data structure integrity when compared.

A modulo of a query result associated with data set A against a modulo array is calculated, and related values in the fingerprint are incremented 440. In one implementation, the fingerprint includes a result array for each modulus. The result array is generated, in one implementation, by calculating a remainder for each unique identifier from each array value in the modulo array. Accordingly, a unique identifier is divided by a moduli to produce a quotient and a remainder. The remainder is recorded in the fingerprint by adjusting (e.g., incrementing) a result value in the result array. For a data set having only integers for unique identifiers, a modulus n has a result array with n result values (e.g., m[6] initially has a result array of {0,0,0,0,0,0}). The resulting fingerprint is representative of data set A and has a probability of uniqueness in accordance with the characteristics of the modulo array.

A modulo of a query result associated with data set B against the same modulo array is calculated, and related values in the modulo array are decremented 440. Again, in one implementation, modulo values from the modulo array are applied against each unique identifier. The remainder is recorded in the fingerprint by complementary adjusting (e.g., decrementing) a result value in the result array.

Whether there are correspondence errors between data sets A and B is determined 450. In the described serial operation, incrementing and decrementing results in a fingerprint having all zeroes when there is full correspondence. In one implementation, a parallel operation can subtract one fingerprint from another to generate a result fingerprint having all zeroes when there is full correspondence. A lack of correspondence will fail to decrement result values that have been incremented.

Figure 5:
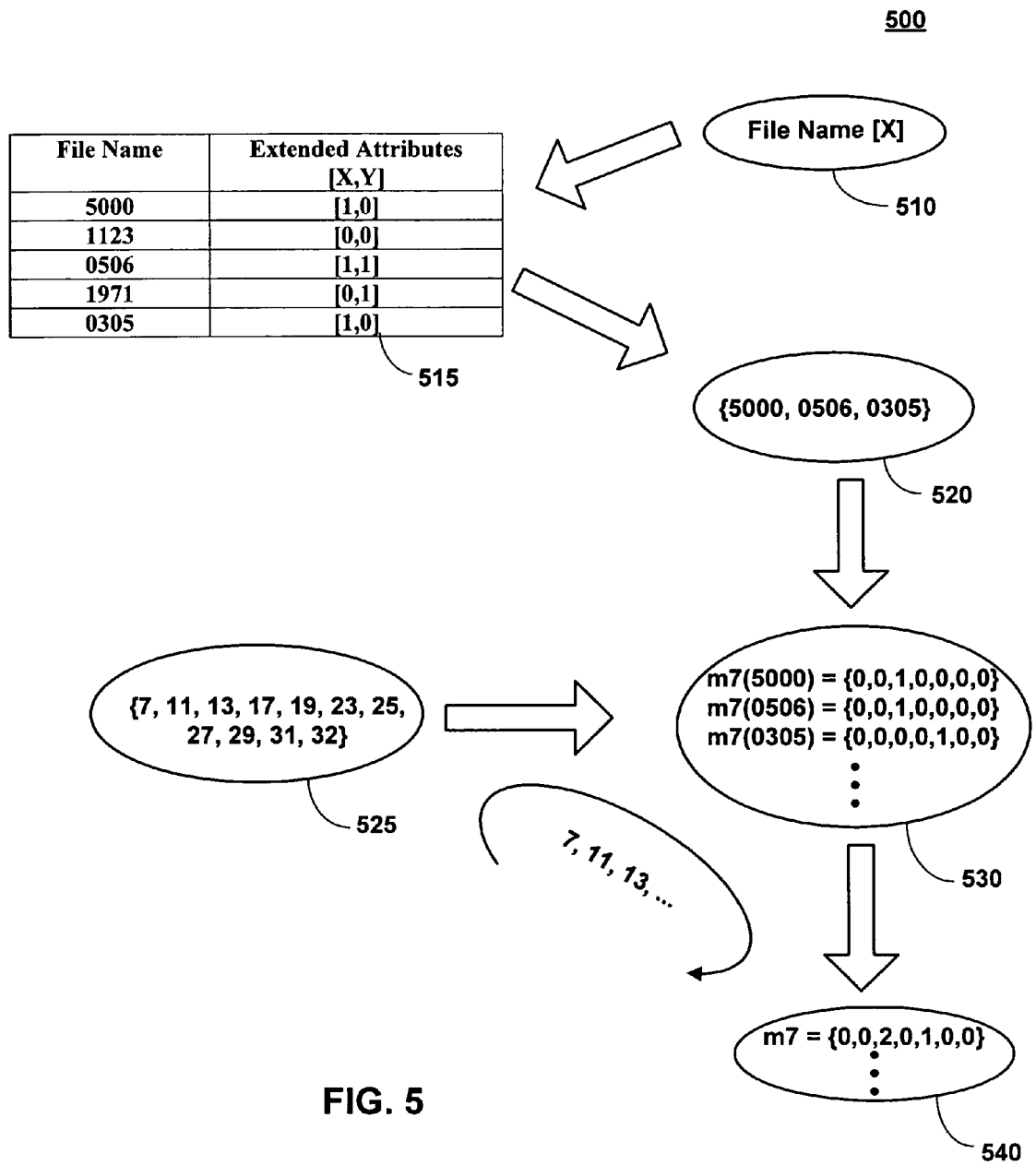
FIG. 5 is a flow diagram illustrating an example of generating a fingerprint for a data set A.
Figure 6:
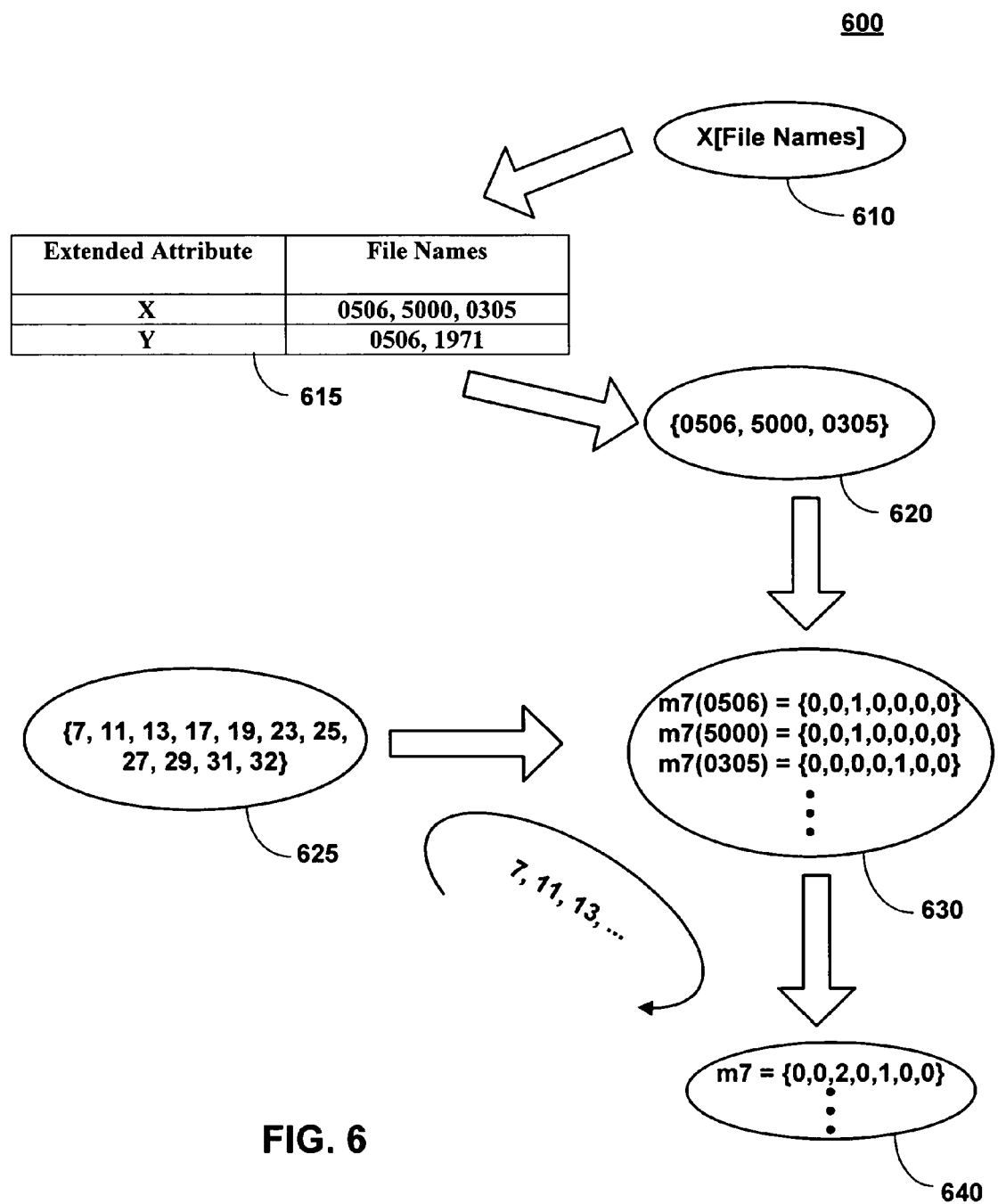
FIG. 6 is a block diagram illustrating an example of generating a fingerprint for a data set B.

FIGS. 5 and 6 are flow diagrams 500,600 illustrating examples of generating fingerprints for an integrity check of file names and an extended attribute, X. The extended attribute can relate to a file category, a keyword describing a file, an application identification for applications associated with a file, and the like.

In FIG. 5, block 510 includes a query request to find file names with an associated attribute X. Table 515 includes a data set A. In this example, a file name serves to uniquely identify the file as an integer. The integers are unordered and contain four digits which support up to 9,999 unique file names. Also, extended attributes X and Y are associated with the file names and are indicated as such with a bit vector (i.e., a 1 indicative of an existence of the extended attribute). The file names can be mapped from a text string and maintained in a separate table.

Block 520 includes query results. Files 5000, 0506, and 0305 each have a 1 in the bit vector of Table 515 for the bit corresponding to extended attribute X. Block 525 includes a modulo array of integers having a relative prime relationship. Block 530 includes a modulo of one of the modulo values, 7, applied against the query results. The operation 5000 modulo 7 leaves a remainder of 2; the operation 0506 modulo 7 leaves a remainder of 2; and the operation of 0305 modulo 7 leaves a remainder of 4. Modulos are also computed using the remaining modulo values in the modulo array of block 525.

Block 540 includes the modulo results of modulo value 7. The remaining modulo results from the modulo array form the fingerprint for data set A in this example.

In FIG. 6, block 610 includes a query request to find file names associated with attribute X. Table 615 includes a data set B which can be populated from the same metadata used to populate table 515. Block 620 includes query results and block 625 includes a modulo array matching the modulo array of FIG. 5. Block 630 includes a modulo of modulo value 7 against the query results. Block 640 includes the modulo results, and thus, fingerprint for data set B.

A comparison of fingerprints from FIGS. 5 and 6 shows that full correspondence exists between data set A and B.

Figure 7:
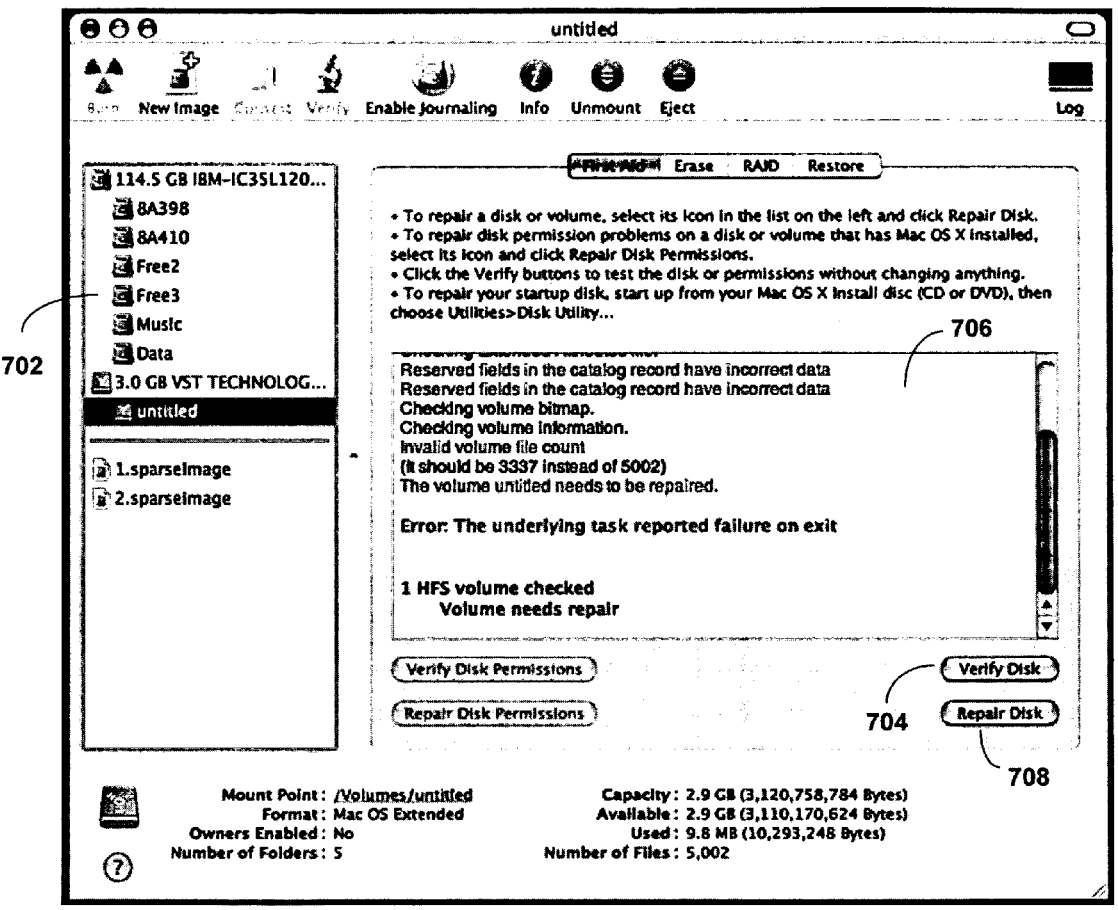
FIG. 7 is a schematic diagram illustrating a user interface.

FIG. 7 is a schematic diagram illustrating an example user interface 700 to manually initialize integrity checking. User interface 700 includes a volume listing 702, a verify disk button 704, a status window 706, and a repair disk button 708.

Volume listing 702 shows data structures available for integrity checking. Verify disk button 704 allows a user to manually initialize an integrity check on a volume selected in volume listing 702. Status window 706 displays information about progress of an integrity check to the user. Information in status window 706 can indicate whether the volume has any correspondence errors. Repair button 708 allows a user to attempt a repair on the corrupted data structures.

The invention and all of the functional operations described herein can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in, e.g., a computing system, a handheld device, a telephone, a consumer appliance, or any other processor-based device. A computing system implementation can include a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. In one implementation, for example, to measure a distribution of residues in a set of numbers (e.g., a set of numbers produced by a pseudorandom number generator). Accordingly, other implementations are within the scope of the following claims.

What is claimed is:

1. A method, including:

receiving a first data structure having a first set of unique identifiers that identify one or more files;

receiving a second data structure having a second set of unique identifiers that identify the one or more files; and verifying, using one or more processors, correspondence between the first and second data structures, including performing a mathematical function on the first and second sets of unique identifiers to produce a result indicative of correspondence, wherein the verifying includes:

calculating a remainder value from a modulo operation for each identifier in the first data set and incrementing a result array using the respective remainder values; and calculating a remainder value from a modulo operation for each identifier in the second data set and decrementing the result array using the respective remainder values, where correspondence is indicated when the decrementing counters the incrementing of the result array.

2. A method, including:

receiving a first data structure having first metadata, the first metadata comprising a first set of two or more identifiers, where each identifier uniquely identifies a particular file;

receiving a second data structure having second metadata, the second metadata comprising a second set of two or more identifiers, where each identifier uniquely identifies a particular file; and verifying, using one or more processors, correspondence between the first and second data structures including, determining one or more result arrays representative of a correspondence between the first and second data structures, where for a first result array the verifying further includes: calculating a remainder value from a modulo operation for identifiers in the first data set and adjusting a first result array using the respective remainder values and calculating a remainder value from a modulo operation for identifiers in the second data set and adjusting the first result array using the respective remainder values, where correspondence is indicated when the adjustments from each remainder value cancel each other out.

3. The method of claim 2, wherein verifying includes determining a result array with a modulo value.

4. The method of claim 2, wherein verifying includes determining a result array with a modulo array.

5. The method of claim 4, wherein the first and second metadata include integers to uniquely identify portions of the first and second data structures.

6. The method of claim 4, wherein the modulo array includes a set of integers, each integer being a relative prime to the set of integers.

7. The method of claim 4, wherein a least common multiple of the modulo array is larger than a total number of unique identifiers associated with the first and second metadata.

8. The method of claim 2, wherein verifying includes:
filtering unique identifiers based on a query request;
adjusting a value in a first result array for each file attribute of the first data structure that satisfies conditions of the query request;
complementary adjusting a value in a second result array for each file attribute of the second data structure that satisfies conditions of the query request, and
comparing of the first and second result arrays to determine correspondence.

9. The method of claim 2, wherein verifying includes:
filtering unique identifiers based on a query request;
adjusting a value in a result array for each file attribute of the first data structure that satisfies conditions of the query request;
complementary adjusting a value in the result array for each file attribute of the second data structure that satisfies the conditions of the query request; and
determining that correspondence exists between the first and second data structures if the result array includes zero values after complementary adjusting is complete.

10. The method of claim 2, further including:
initializing verification responsive to one or more of a hardware power interruption, a software crash, a software exception, a time out, or a user selection from a user interface.

11. The method of claim 2, further including:
outputting results of verifying including a correspondence error flag.

12. The method of claim 2, further comprising:
performing a data repair responsive to a correspondence error between the first and second data structures.

13. The method of claim 2, wherein the first and second data structures are associated with a file structure selected from the group containing a HFS (Hierarchical File System), UFS (Unix File System), NTFS (New Technology File System), and FAT (File Allocation Table).

14. The method of claim 2, wherein the first and second metadata includes file names and attributes associated with files.

15. A method, including:
receiving a first data structure having unique integers, where each integer is associated with a particular file name;
receiving a second data structure having the unique integers associated with the one or more file names, the second data structure organized differently from the first data structure; and
verifying, using one or more processors, correspondence between the first and second data structures including, determining one or more result arrays with a modulo array, each modulo value in the modulo array being a relative prime to the set of integers and the modulo array having a least common multiple that is greater than or equal to a total number of the unique integers, the one or more result arrays representative of a correspondence between the first and second data structures, where for a first result array the verifying further including: calculating a remainder value from a modulo operation for identifiers in the first data set and adjusting a first result array using the respective remainder values and calculating a remainder value from a modulo operation for identifiers in the second data set and adjusting the first result array using the respective remainder values, where correspondence is indicated when the adjustments from each remainder value cancel each other out.

16. A method, including:
receiving a first data structure having first metadata associated with one or more files, the first metadata comprising a first set of identifiers that identify the one or more files;
receiving a second data structure having second metadata associated with the one or more files, the second metadata comprising a second set of identifiers that identify the one or more files;
initializing verification responsive to one or more of a power interruption, a software crash, a software exception, a time out or a user selection from a user interface;
verifying, using one or more processors, correspondence between the first and second data structures including, determining one or more result arrays representative of a correspondence between the first and second data structures, where for a first result array the verifying further includes: calculating a remainder value from a modulo operation for identifiers in the first data set and adjusting a first result array using the respective remainder values, and calculating a remainder value from a modulo operation for identifiers in the second data set and adjusting the first result array using the respective remainder values structures;
outputting results of the verification including a correspondence error flag; and
performing a data repair responsive to a correspondence error between the first and second data structures.

17. A system, including:
a computer-readable medium;
one or more processors;
a first data structure, stored in the computer-readable medium, having first metadata associated with one or more files, the first metadata comprising a first set of two or more identifiers, where each identifier uniquely identifies a particular file;
a second data structure, stored in the computer-readable medium, having second metadata associated with the one or more files, the second metadata comprising a second set of two or more identifiers, where each identifier uniquely identifies a particular file; and
a fingerprint block, configured for execution by the one or more processors and in communication with the first and second data structures, to verify correspondence between the first and second data structures, the fingerprint block determining one or more result arrays representative of a correspondence between the first and second data structures, where for a first result array the verifying further includes: calculating a remainder value from a modulo operation for identifiers in the first data set and adjusting a first result array using the respective remainder values and calculating a remainder value from a modulo operation for identifiers in the second data set and adjusting the first result array using the respective remainder values, where correspondence is indicated when the adjustments from each remainder value cancel each other out.

18. The system of claim 17, wherein the fingerprint block includes a modulo block to determine a result array with a modulo value.

19. The system of claim 17, wherein the fingerprint block includes a modulo block to determine a result array with a modulo array.

20. The system of claim 19, wherein the first and second metadata include integers to uniquely identify portions of the first and second data structures.

21. The system of claim 19, wherein the modulo array includes a set of integers, each integer being a relative prime to the set of integers.

22. The system of claim 19, wherein a least common multiple of the modulo array is larger than a total number of unique identifiers associated with the first and second metadata.

23. The system of claim 17, wherein the fingerprint block includes:
- a query block to filter unique identifiers based on a query request;
- a modulo block to adjust a value in a first result array for each file attribute of the first data structure that satisfies conditions of the query request and complementary adjusting a value in a second result array for each file attribute of the second data structure that satisfies conditions of the query request; and
- a comparison block to compare the first and second result arrays.

24. The system of claim 17, wherein the fingerprint block includes:
- a query block to filter unique identifiers based on a query request;
- a modulo block to adjust a value in an array for each file attribute of the first data structure that satisfies conditions of the query request, and complementary adjust a value in the array for each file attribute of the second data structure that satisfies the conditions of the query request; and
- a comparison block to determine that correspondence exists between the first and second data structures if the array includes zero values after complementary adjusting is complete.

25. The system of claim 17, further comprising:
- an event monitor, in communication with the fingerprint block, to initialize verification in the fingerprint block responsive to one or more of a hardware power interruption, a software crash, a software exception, a time out or a user selection from a user interface.

26. The system of claim 17, wherein the fingerprint block outputs results of verifying including a correspondence error flag.

27. The system of claim 17, further comprising:
- a data repair block, in communication with the fingerprint block, to perform a data repair responsive to a correspondence error between the first and second data structures.

28. The system of claim 17, wherein the first and second data structures are associated with a file structure selected from the group containing a HFS (Hierarchical File System), UFS (Unix File System), NTFS (New Technology File System), and FAT (File Allocation Table).

29. The system of claim 17, wherein the first and second metadata includes file names and attributes associated with files.

30. A computer program product, tangibly stored on a computer-readable medium, the product including instructions operable to cause a computer system to perform a method, including
- receiving a first data structure having a first set of unique identifiers that identify one or more files;
- receiving a second data structure having a second set of unique identifiers that identify the one or more files; and
- verifying correspondence between the first and second data structures, including performing a mathematical function on the first and second sets of unique identifiers to produce a result indicative of correspondence, wherein the verifying includes:
- calculating a remainder value from a modulo operation for each identifier in the first data set and incrementing a result array using the respective remainder values; and
- calculating a remainder value from a modulo operation for each identifier in the second data set and decrementing the result array using the respective remainder values, where correspondence is indicated when the decrementing counters the incrementing of the result array.

* * * * *

UNITED STATES PATENT AND TRADEMARK OFFICE
CERTIFICATE OF CORRECTION

| | | |
|---|---|---|
| PATENT NO. | : 7,774,320 B1 | Page 1 of 1 |
| APPLICATION NO. | : 11/097776 | |
| DATED | : August 10, 2010 | |
| INVENTOR(S) | : Mark Steven Day et al. | |

It is certified that error appears in the above-identified patent and that said Letters Patent is hereby corrected as shown below:

In column 12, line 46, in claim 16, delete "structures;" and insert -- ; --, therefor.

In column 14, line 30, in claim 30, delete "including" and insert -- including: --, therefor.

Signed and Sealed this
Twenty-second Day of November, 2011

David J. Kappos
*Director of the United States Patent and Trademark Office*